Jan. 30, 1962 M. B. BRILLIANT 3,019,335

LARGE BANDWIDTH LOW NOISE ANTENNA CIRCUIT

Filed Sept. 14, 1959

INVENTOR.
MARTIN B. BRILLIANT
BY Kenway, Jenney, Witter & Hildreth
ATTORNEYS

United States Patent Office 3,019,335 Patented Jan. 30, 1962

3,019,335
LARGE BANDWIDTH LOW NOISE ANTENNA CIRCUIT

Martin B. Brilliant, Boston, Mass., assignor to National Company, Inc., Malden, Mass., a corporation of Massachusetts
Filed Sept. 14, 1959, Ser. No. 839,856
18 Claims. (Cl. 250—20)

This invention relates to a radio communications receiver characterized by improved noise rejection. More specifically, it relates to a low frequency receiver providing increased effectiveness in the rejection of impulse type noise. The receiver has a broad band input section which presents the antenna circuit with a low effective load resistance without significantly decreasing the signal-to-noise ratio. The broad pass band permits the use of noise limiters which limit the effect of noise impulses to the duration of the impulses. Since the duration of a signal pulse in this frequency region is considerably greater than that of a noise impulse, the over-all effect of a noise limiter of this type in our receiver is to materially reduce difficulties in reception resulting from noise impulses.

The radio frequencies below 400 kilocycles are generally used for long-range communications between fixed shore transmitters and receivers based on ships or other vehicles or between two fixed shore stations. At these frequencies, signals may be transmitted to almost any point in the world entirely by ground waves. Since there is no sky wave propagation, the variables affecting sky wave propagation have no effect. Thus, variations in such factors as ionization of the upper atmosphere, temperature inversion and other phenomena, which support transmission of higher frequency signals in the upper atmosphere, do not disturb very low frequency communications. The resulting reliability of propogation at low frequencies is the primary reason for their use.

However, the problem of impulse noise, commonly called static, is considerably greater at low frequencies than at high frequencies. This type of noise, which results largely from lightning discharges as well as various man-made sources, contains a much greater energy in the low frequency portion of the radio spectrum than at higher frequencies. The otherwise advantageous propagation characteristics at the lower frequencies also contribute to this problem, since noise impulses may thus be transmitted to a receiver from any point along the earth's surface or above it.

Effective noise limiting circuits for impulse type noise generally operate in one of two ways. Some circuits distinguish between a noise impulse and the transmitted signal, and when a noise impulse is received, they silence or desensitize the receiver for the duration of the impulse. Another method is to use a clipping circuit which limits the amplitude passed by the receiver to the average amplitude of the transmitted signal. In either case, whether the receiver operation is momentarily interrupted or a low amplitude, short duration pulse is passed, there will be practically no effect on the receiver output, since the duration of the noise limiter action, which is roughly equal to the duration of the noise impulse, is much shorter than the duration of a "bit" of the transmitted signal. For example, in the transmission of single channel Teletype or Morse code at the rate of 60 words per minute, the duration of a code element is approximately 20 milliseconds. The duration of the average noise impulse is less than 1 millisecond and therefor, if the noise-limiting circuits function properly, there will be negligible disturbance of the output signal of the receiver. However, the use of noise limiters has not provided the desired results prior to my invention, a principal object of which is to provide a communications receiver having improved noise rejection characteristics.

Another object of my invention is to provide a communications receiver of the above character adapted for operation at signal frequencies below 400 kilocycles and particularly in the region of 20 kilocycles. A further object of my invention is to provide a receiver of the above type capable of efficient operation with noise limiters of the amplitude clipping or receiver silencing type. A further object of my invention is to provide a receiver having the above characteristics adapted for operation with the loop antennas commonly used on ships. A further object of the invention is to provide a receiver of the above character whose cost is comparable to prior receivers used in this frequency range. Other objects will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description, taken in connection with the accompanying drawing, in which.

Figures 1, 2, 3:
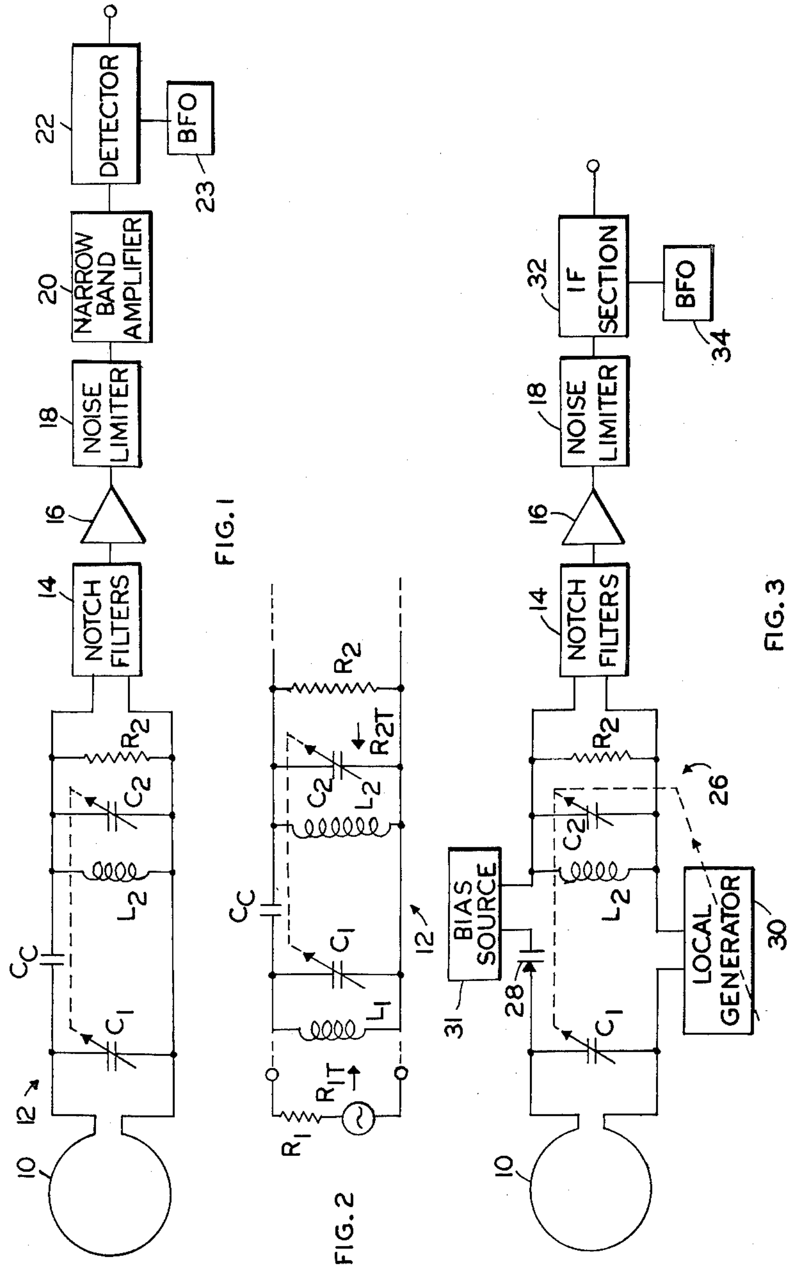
FIG. 1 is a schematic diagram of a receiver incorporating my invention.
FIG. 2 is a schematic diagram depicting an equivalent circuit of the input section of the receiver of FIG. 1.
FIG. 3 is a schematic diagram of another receiver embodying my invention and incorporating a parametric amplifier in its output section.

In general, my invention makes use of novel means for broadening the bandwidth of the input section of the receiver without suffering an appreciable degradation in signal-to-noise ratio, thereby increasing the effectiveness of a noise limiter designed to operate on noise impulses. If narrow band circuits precede the noise limiter in the receiver, i.e. are inserted between the antenna and the limiter, the effect of the limiter is largely nullified. Narrow band circuits, by their very nature, cannot pass short duration impulses. A noise impulse entering a circuit of this type is appreciably broadened so that its duration becomes approximately as long as the reciprocal of the bandwith. That is, the duration in seconds of a pulse leaving a network will be approximately as long as the reciprocal of the bandwidth in cycles per second. This has two effects on the noise limiting action. In the first place, it becomes more difficult for the noise limiter to distinguish between the noise and the signal, since the short rise time and high amplitude characteristic of a noise pulse are largely lost by the stretching or averaging action of the narrow band circuit. Furthermore, if the noise limiter does operate, the period during which the receiver is silenced or the duration of a clipped noise pulse, depending on which type of limiter is used, will become comparable to the length of a transmitted signal, thereby resulting in significant errors in reception of the signal. To put it another way, the signal-to-noise ratio at the output of the limiter is low because the average power of the noise is high as a result of the long duration of the effects of noise impulses.

The limiting factor on the bandwidth of a low frequency receiver is the bandwidth of the input circuit including the antenna. The antenna circuit must be tuned in order to obtain an appreciable signal from the antenna. Assuming a reasonable amount of dissipation in the tuned circuit, it may easily have a Q of 100 corresponding to a bandwidth of 200 cycles at a frequency of 20 kilocycles. The bandwidth might be increased by loading the circuit with a resistance element, but the additional noise introduced by a resistor directly connected to the circuit will result in an appreciable increase in the noise figure of the receiver.

My invention makes use of a transformation network taking the form of a double tuned filter having many of the characteristics of a quarter wave length line over an appreciable frequency range. The impedance seen looking into either end of the filter is roughly inversely proportional to the impedance of the load connected across the other end. Thus a large resistance across the output of a parallel-tuned filter will be reflected as a small resistance across tuned circuit incorporating the antenna. The bandwidth of the circuit may be materially increased in this manner. At the same time there is a relatively small increase in interanlly generated noise, as explained below. In one form, the transformation network incorporates only passive elements which may be connected as illustrated in FIG. 1 and as described below in the form of a pi filter. In another form, the network may include a parametric or variable reactance amplifier which provides low noise amplification and thereby results in a significant improvement in the noise figure of the receiver.

As seen in FIG. 1, a receiver constructed according to my invention may include an antenna 10 schematically shown as a loop antenna connected to a transformation network generally indicated at 12. The output of the network 12 is passed through notch filters 14 to a broad band amplifier 16. The amplified signal is acted on by a noise limiter 18 and then amplified by a narrow band amplifier 20 whose output is connected to a detector 22.

The notch filters 14 are used to reject strong signals on channels adjacent to the one in which the desired signal is being transmitted. If the strength of these signals is great enough, they will overload the amplifier 16 and desensitize it to the desired signal as well as causing considerable intermodulation distortion. The filters 14 should be high Q filters which affect the operation of the network 12 only at the frequencies to which they are tuned. For example, they may be mechanical filters which present effective series tuned circuits across the line, thereby effectively short circuiting the signals which are to be rejected.

The narrow band amplifier 20 following the noise limiter 18 should have a bandwidth only great enough to accommodate the desired signal. In addition to rejecting signals not completely attenuated by the fitters 14, it serves to reduce the so-called white noise whose energy is proportional to bandwidth. Assuming transmission of cw signals, e.g., continental code, the detector 22 may comprise a mixer which heterodynes the output of a local beat frequency oscillator 23 against the signal from the amplifier 20 to provide an audible output signal.

The loop antenna 10 is inductive at the frequency of operation, and therefore it is tuned by means of a capacitor $C_1$ connected across the antenna terminals and a coupling capacitor $C_c$. On the other side of the capacitor $C_c$ is a tank circuit comprising an inductor $L_2$ and a capacitor $C_2$ as well as a loading resistor $R_2$.

As seen in FIG. 2, the network 12 is actually a double-tuned pi filter with an input tank comprising the capacitor $C_1$ and an inductor $L_1$ representing the inductance of the antenna 10. The signal appearing at the antenna terminals may be represented as generated by a generator 24 in series with a resistor $R_1$. The resistor $R_1$ mainly represents the physical resistance of the antenna 10 in series with the inductance $L_1$ plus an amount corresponding to the radiation resistance of the antenna, transformed into a parallel equivalent. The capacitors $C_1$ and $C_2$ are preferably variable in order to tune the network 12. They are adjusted so that each of the tanks $L_1C_1$ and $L_2C_2$ is in series resonance with the coupling capacitor $C_c$. Preferably, the coupling of the two coupled tuned circuits is adjusted to provide a maximally flat response.

The network 12 has many of the attributes of a quarter wave length line. For example, the output voltage across the resistor $R_2$ will be approximately 90 degrees out of phase with the voltage across the inductance $L_1$. Of greater importance is the fact that the reflected resistance at each end of the filter is inversely proportional to the terminating resistance at the other end. Thus, the resistance $R_{1T}$ looking toward the right in FIG. 2 is given by $$R_{1T}=\frac{1}{\omega^2 C_c^2 R_2}$$

and the resistance $R_{2T}$ looking into the filter from the resistor $R_2$ is given by $$R_{2T}=\frac{1}{\omega^2 C_c^2 R_1}$$

Thus, the resistor $R_2$ may have a very large resistance which will be reflected as a small resistance $R_{1T}$ at the input terminals of the filter. The presence of the reflected resistance across the tank $L_1C_1$ appreciably lowers the Q of the series tuned circuit incorporating this tank and correspondingly broadens the bandwidth. On the other hand, the resistance $R_1$, which may have a value of 2 megohms, may be made to provide a reflected resistance $R_{2T}$ of 10,000 ohms. This resistance appears across the much larger resistance $R_2$ and its loading effect greatly reduces the thermal noise voltage generated by the latter resistor.

Although there is a step down in voltage through the network 12, this is more than offset by the increase in the terminal voltage of the loop 10 resulting from tuning of the loop. The resulting signal voltage across the resistor $R_2$ is still great enough, in most cases, for amplification by an amplifier 16 using low noise circuits without an undue increase in noise figure.

The following values of the various elements may be used in the network 12 for an input frequency of 20 kilocycles.

| | | |
|---|---|---|
| $L_1$ | henry | .158 |
| $L_2$ | do | .316 |
| $C_1$ | $\mu\mu$f | 344 |
| $C_2$ | $\mu\mu$f | 144 |
| $C_c$ | $\mu\mu$f | 56 |
| $R_2$ | ohms | 141,000 |

The capacitors $C_1$ and $C_2$ may be mechanically coupled or ganged to each other to facilitate tuning of the receiver to various input frequencies.

With the above circuit values, the reflected resistance $R_{2T}$ will be on the order of 10,000 ohms. This will effectively load the thermal noise generation of the resistor $R_2$ so that only a fraction of the noise voltage generated in the latter resistor will appear across its terminals. At the same time, the reflected resistance $R_{1T}$ will be approximately 140,000 ohms, thereby considerably lowering the Q of the tuned circuit of which the loop 10 is a part and providing an over-all bandwidth of approximately 4,000 cycles. Taking into account the reduction of the signal voltage in the network 12 and the noise generated by the resistor $R_2$ appearing across its terminals, and assuming an equivalent noise resistance of 2,000 ohms in series with the input of the amplifier 16 with negligible noise production in the filters 14, an over-all noise figure of 1.2 db may be obtained. This should be compared with the case of a simple tuned circuit with a resistor connected across it to lower the Q and increase the bandwidth. This would be accomplished for example by a 100,000 ohm resistor with a resultant noise figure of 13 db.

Other bandwidths are obtainable by substituting different values of $R_2$. The approximate bandwidth for a given resistance may be calculated from the well-known relationships between the bandwidth of a tuned circuit and the relative values of its reactive and dissipative elements. The effect of the double tuning should also be taken into account. A simpler method is to vary the value of $R_2$ until the bandwidth, as measured, is great enough. Generally the bandwidth from the antenna to the input of the noise limiter 18 should be at least ten times the signal bandwidth.

In certain cases, the receiver of FIG. 3, incorporating a transformation network generally indicated at 26 which includes a parametric amplifier, may provide significant advantages over the circuit of FIG. 1. Thus, the signal-to-noise ratio at the antenna terminals may be so low as to require an absolute minimum increase in the relative noise level. The use of a parametric amplifier-frequency converter provides essentially noise free amplification, thereby overcoming the reduction in signal strength encountered in the network 12 of FIG. 1 and swamping the noise voltage of the resistor $R_2$ appearing across the terminals of the resistor.

A parametric amplifier makes use of a variable reactance element whose reactance is varied in accordance with the output of a local oscillator. The incoming signal is passed through the element and, in a well-known manner, the current through the varying reactance will include components at the sum and difference frequencies of the signal and oscillator. If the circuit values are chosen to provide an output frequency higher than the frequency of the input signal, there will be a net gain in power, the gain being roughly equal to the ratio of output to input frequencies. A component which has proven highly successful as a variable reactance device is a reverse biased p-n junction type silicon diode. These diodes present capacitive reactances across their junctions when biased in the reverse direction, and the bias and the capacitance varies with the applied voltage. Thus, the voltage from the local oscillator applied across the diode may be made to vary the reactance of the diode which then operates in the above manner to provide both frequency conversion and gain. It will be noted that, at the low frequencies which the present invention is intended to operate, it is possible to obtain the desired reactance variations by mechanically altering the physical characteristics of capacitors or inductors. However, because of their relatively low cost and compactness, I prefer to use junction diodes. The network 26, when connected as shown in FIG. 3, has impedance transformation characteristics similar to those of the circuit 12 of FIG. 1. The network 26 is provided with a diode 28 and a bias source 31 which applies a reverse bias to the diode. A local generator 30 is connected to apply its output voltage across the diode 28 and thereby vary the capacitance of the diode at a rate corresponding to the generator frequency. Thus, the reflected resistance appearing at the input terminals of the equivalent circuit is given by, $$R_{1T}=\frac{1}{\omega_1\omega_2 C_x^2 R_2}$$

and the reflected impedance looking to the left from the resistor $R_2$ is given by $$R_{2T}=\frac{1}{\omega_1\omega_2 C_x^2 R_1}$$

$\omega_1$ is the angular frequency of the input signal,
$\omega_2$ is the angular frequency of the output of the network 26, and
$C_x$ is one half the peak value of the first harmonic of the the capacity variation of the diode 28, i.e., at the frequency of the generator 30.

The tuning arrangements in the network 26 are the same as in the network 12. That is, the values of $C_1$ and $C_2$ are chosen so that the parallel combination of these condensers and the average value $C_0$ of the capacitance of the diode 28 resonates the input tank comprising the antenna 10 and the parallel combination of capacitor $C_1$ and $C_0$ and the output tank comprising $L_2$ and the parallel combination of $C_2$ and $C_0$. The generator 30 should present a low impedance across its terminals to both the input and output frequencies of the network 26. This may be accomplished, for example, by the use of a high Q tank circuit in the output of the generator. The bias source 31, when connected as shown, should provide a low impedance across its terminals to the various frequencies appearing across it. $C_x$ is the critical design parameter. $C_0$ may be any value so long as it is less than the lower of the values required to resonate the input or output tank circuits.

For an input signal frequency of 20 kilocycles and an output frequency of 1 megacycle, the following values may be used for the various elements in the circuit 26:

| | |
|---|---|
| $C_1$ | $400\mu\mu f.-C_0$. |
| $C_2$ | $100\mu\mu f.-C_0$. |
| $L_2$ | $253\mu h$. |
| $R_2$ | 282,000 ohms. |
| $C_x$ | $5.6\mu\mu f$. |

The frequency of the generator 30 will be 980 kilocycles. Should the required value of $C_x$ be unobtainable with a single diode 28, a number of diodes may be paralleled with each other and with a fixed capacitor. The reflected resistance $R_{2T}$ appearing across the resistor $R_2$ will be approximately 20,000 ohms, and therefore the proportion of the thermal noise voltage generated by the resistor $R_2$ appearing across this resistor will be negligible. To this should be added the fact that, with the specified input and output frequencies, there will be a power gain of 50. As a result, the receiver will have a noise figure of less than 0.1 db for a relatively flat response over a 4 kilocycle bandwidth.

Because of the stepup in frequency by the circuit 26, a signal appearing at the output of the noise limiter 18 is at a frequency of 1 megacycle. Therefore, I prefer to connect the noise limiter to an intermediate frequency section 32 incorporating a frequency converter which converts the signal to a lower frequency more amenable to narrow band amplification. The I.F. section 32 also includes a narrow band filter as well as a mixer which heterodynes the signal with the output of a beat frequency oscillator 34 to provide an audible output signal. The capacitors $C_1$ and $C_2$ may also be mechanically coupled with the frequency-determining element in the generator 30 so that the receiver may be tuned by means of a single adjustment. Suitable padding and trimming capacitors (not shown) may be used to facilitate tracking.

Thus, I have described a novel low frequency receiver adapted for improved rejection of impulse noise without significantly increasing thermal noise generated by resistors and similar elements. The receiver has a wide band input section which passes the noise impulses without appreciably lengthening them relative to the duration of signal impulses. The effects of the noise impulses are then substantially mitigated by use of a noise limiter which may be of either the silencing or clipping type. I achieve the wide bandwidth in the input section by incorporating the antenna in a network which has the impedance transformation characteristics of a quarter wave length line. Thus, a loading resistor connected across the output terminals of the section may be made to reflect a low resistance into the tuned circuit of which the antenna is a part. This lowers the Q of the circuit and thus increases the bandwidth. At the same time, the noise contribution by the loading resistor is reduced by the reflection of the equivalent antenna resistance into the output of the transformation network. This reflected resistance is much smaller than the resistance of the loading resistor.

I have also described an embodiment of my receiver in which the transformation network includes a variable reactance amplifier. The amplifier provides a large power gain with negligible noise generation, with a resulting noise figure of less than 0.1 db. It should be noted that the principles of my invention may be applied to other antennas than those having a loop configuration. The individual circuit elements will then be arranged differently, and by well-known filter techniques, the above impedance transformation characteristics may be obtained. Nor are the specific transformation circuits shown in FIGS. 1 and 3 the only ones which will provide the desired results with loop antennas. The coupling between the two tuned circuits $L_1C_1$ and $L_2C_2$ may be accomplished by mutual inductances as well as capacitances, and the coupling elements may be parallel-connected as well as series-connected between the tuned circuits.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An improved low frequency communications receiver, said receiver comprising an antenna, a broad band amplifier having a pair of input terminals, a filter connected between said antenna and said amplifier, said filter comprising a tuned circuit including said antenna, said tuned circuit resonating at a frequency below 400 kilocycles, said filter having impedance transformation characteristics similar to those of a quarter wave length line, a loading resistor connected across the input terminals of said amplifier, the resistance of said resistor being substantially greater than the reflected resistance of said antenna at said input terminals of said amplifier, and an impulse-type noise limiter connected to the output of said amplifier.

2. The combination defined in claim 1 in which the value of said loading resistor is such that the reflected resistance of said resistor at the input terminals of said filter is less than the equivalent parallel resistance of said antenna across a parallel tuned circuit comprising the inductance of said antenna.

3. The combination defined in claim 1 including a detector connected to detect the output signal from said noise limiter.

4. The combination defined in claim 1 in which the resistance of said loading resistor is such as to provide a 4 kilocycle bandwidth from said antenna to said input terminals of said amplifier.

5. The combination defined in claim 1 in which resistance of said loading resistor is such as to provide a bandwidth from said antenna to said input terminals of said amplifier at least 10 times the bandwidth of the signal received by said receiver.

6. A low frequency radio communications receiver comprising a filter having input terminals and output terminals, a broad band amplifier, means connecting said output terminals of said filter to said amplifier, an impulse type noise limiter connected to the output of said broad band amplifier, a narrow band amplifier connected to the output of said noise limiter, and a detector connected to the output of said narrow band amplifier, means for connecting an antenna to one of said input terminals of said filter, a resistor connected to one of said output terminals of said filter, said filter having impedance transformation characteristics approximating those of a quarter wave length line, reactive elements in said filter adapted to form a tuned circuit with said antenna resonating at a frequency below 400 kilocycles, the relationship between the resistance of said resistor and the resistance reflected by said filter at its output being such that the predominant portion of the noise voltage generated by said resistor appears across points other than said output terminals of said filter.

7. The combination defined in claim 6 in which the resistance of said resistor reflected by said filter is such as to provide a bandwidth at least 10 times the bandwidth of the signal received by said receiver.

8. The combination defined in claim 7 in which said tuned circuit is adapted to resonate at 20 kilocycles and the resistance of said resistor is such as to provide a bandwidth of 4 kilocycles from said antenna to the output of said broad band amplifier.

9. The combination defined in claim 6 in which said filter and said antenna form a double-tuned network, said filter including a reactive coupling element between the tuned portions of said network.

10. The combination defined in the claim 9 in which said coupling element has a variable reactance and including means for cyclically varying the reactance of said element, whereby the signal at the input of said broad band amplifier is at an intermediate frequency related to the input frequency of said receiver and the frequency of said reactance variation.

11. The combination defined in claim 10 including means for varying the reactance of said coupling element at a rate substantially greater than the frequency of the signal received by said receiver.

12. A low frequency communications receiver comprising a loop antenna, a first tuning capacitor connected across the terminals of said antenna, an inductor and a second turning capacitor connected in parallel with each other, a reactive coupling element connected in series between said first and second tuning capacitors, a resistor connected across said second tuning capacitor, a broad band amplifier deriving its input from the voltage across said resistor, a noise limiter connected to the output of said broad band amplifier, a narrow band amplifier connected to the output of said noise limiter, and a detector connected to the output of said narrow band amplifier, the resistance of said resistor being substantially greater than the resistance reflected thereacross from said antenna, the reactance of said coupling element being such as to resonate with the parallel combinations including said tuning capacitors at frequencies substantially the same as a frequency below 400 kilocycles, the reactance of said element being such as to reflect across the equivalent parallel tuned circuit including said antenna a resistance substantially less than the parallel equivalent resistance of said antenna.

13. The combination defined in claim 12 in which the resistance of said resistor and the reactance of said coupling element are such as to provide a bandwidth of at least 10 times the bandwidth of the signals received by said receiver at the output of said broad band amplifier.

14. The combination defined in claim 12 in which said receiver is adapted to tune to 20 kilocycles and the resistance of said resistor and the reactance of said coupling element are such as to provide a bandwidth of 4 kilocycles at the output of said broad band amplifier.

15. The combination defined in claim 12 in which said coupling element has a variable reactance, and including means for cyclically varying the reactance of said element to provide amplification and heterodyning of said input signal.

16. A low frequency communications receiver comprising a loop antenna, a first tuning capacitor connected across the terminals of said antenna, an inductor and a second tuning capacitor connected in parallel with each other, a variable capacitance diode connected in series between said first and second tuning capacitors, a resistor connected across said second tuning capacitor, a broad band amplifier deriving its input from the voltage across said resistor, a local generator, means for applying the output voltage of said generator across said diode whereby the signal frequency appearing across said antenna terminals is converted to an intermediate frequency signal appearing across said resistor, the average capacitance of said diode being such as to resonate with said antenna and first tuning capacitor at the frequency of said input signal and resonate with said inductor and said second tuning capacitor at said intermediate frequency, the resistance of said resistor being substantially greater than the resistance reflected thereacross of said antenna.

17. The combination defined in claim 1 in which said filter has said impedance transformation characteristics over a frequency range at least ten times the bandwidth of the signal received by said receiver.

18. The combination defined in claim 12 in which said reactance element is a capacitor.

References Cited in the file of this patent

UNITED STATES PATENTS

| | | |
|---|---|---|
| 1,367,224 | Arnold | Feb. 1, 1921 |
| 1,851,091 | Fetter | Mar. 29, 1932 |
| 2,005,388 | Pettman et al. | June 18, 1935 |

FOREIGN PATENTS

| | | |
|---|---|---|
| 102,486 | Austria | Sept. 15, 1925 |